United States Patent [19]

Repsher

[11] 4,121,132

[45] Oct. 17, 1978

[54] PHOSPHOR COATING METHOD AND RESULTING FLUORESCENT LAMP

[75] Inventor: Robert W. Repsher, Bloomfield, N.J.

[73] Assignee: Westinghouse Electric Corp., Pittsburgh, Pa.

[21] Appl. No.: 837,069

[22] Filed: Sep. 28, 1977

[51] Int. Cl.[2] .................... C09K 11/42; H01J 61/46

[52] U.S. Cl. .................... 313/486; 313/493; 427/67

[58] Field of Search .................... 427/67, 157; 313/486, 313/487, 485, 493

[56] References Cited

U.S. PATENT DOCUMENTS

| | | | |
|---|---|---|---|
| Re. 20,909 | 11/1938 | Claude | 427/47 |
| 2,706,691 | 4/1955 | Schaefer | 427/67 |
| 3,503,780 | 3/1970 | Kamiya | 220/2.1 |
| 3,514,276 | 5/1970 | Fujio et al. | 65/103 |
| 3,963,639 | 6/1976 | Klein | 252/301.36 |

FOREIGN PATENT DOCUMENTS

| | | | |
|---|---|---|---|
| 678,692 | 9/1952 | United Kingdom | 427/67 |

*Primary Examiner*—Palmer C. Demeo
*Attorney, Agent, or Firm*—W. D. Palmer

[57] ABSTRACT

Especially for the fluorescent lamps which have an annular shaped envelope, the phosphor coating is adhered to the interior surface of the envelope by a melted and solidified mixture of boric anhydride and sodium borate. The weight ratios of total boric acid plus sodium borate to the phosphor, as present in the coating suspension, and the relative weight ratios of boric acid to sodium borate in the coating suspension are relatively critical for best performance.

10 Claims, 1 Drawing Figure

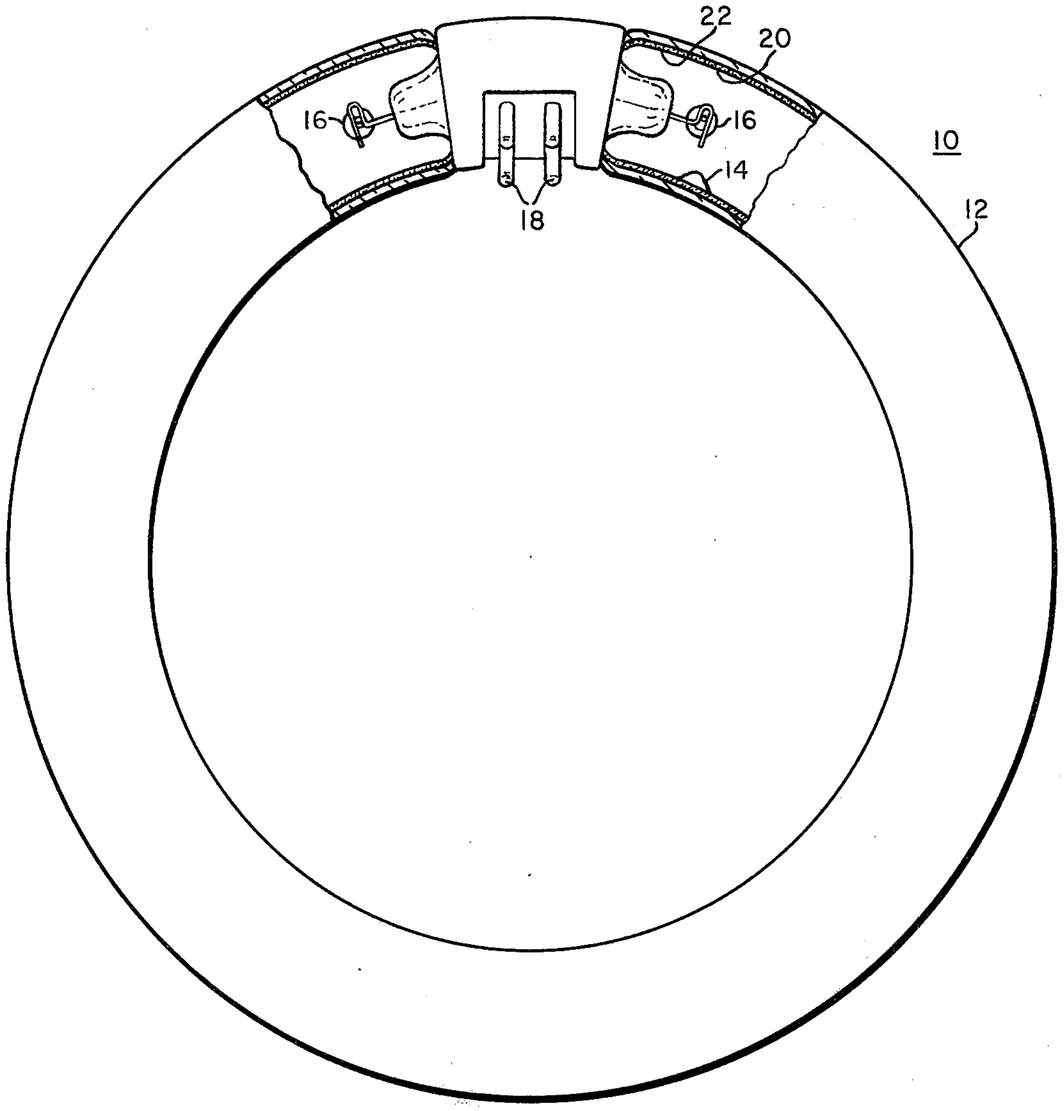
22
20
16
16
10
14
12
18

PHOSPHOR COATING METHOD AND RESULTING FLUORESCENT LAMP

BACKGROUND OF THE INVENTION

This invention relates to fluorescent lamps and, more particularly, to annular shaped fluorescent lamps having an improved phosphor coating and to a method for applying the phosphor to improve the performance thereof.

Boric acid, borax or other similar compounds are well known as adhesion promoters for finely divided phosphor coatings applied to the interior surface of fluorescent lamp envelopes. Such adhesion promoting materials are disclosed in U.S. Pat. No. Re. 20,909, dated Nov. 8, 1938 to Claude. In addition, U.S. Pat. Nos. 2,706,691, dated Apr. 19, 1955 to Schaefer; 3,503,780, dated Mar. 31, 1970 to Kamiya; 3,514,276, dated May 26, 1970 to Fugio et al.; and 3,963,639, dated June 15, 1976 to Klein are representative of the highly-developed state of the art with respect to such adhesion promoting coatings. Some of these patents also list as separate adhesion promotors other borates such as sodium borate, see U.S. Pat. No. 3,963,639 at column 1, line 58 thereof.

Fluorescent lamps which have an annular shape are normally first coated with the phosphor material and after the coating operation, the envelopes are bent from a straight configuration to an annular configuration. This has made the coating operation relatively difficult and many of the foregoing adhesion promoting additives have been used in conjunction with such annular shaped lamps, for example, see U.S. Pat. Nos. 3,514,276 and 3,503,780 referred to hereinbefore. Even when adhesion promoters are used with such lamps, it is usually necessary during preparation of the coating suspension to grind the phosphor to a much finer status than is necessary in the case of straight lamps so that it will adhere better and additives such as listed hereinbefore have also been used. The excess grinding results in reducing the brightness of the phosphor and the loss of light output averages about 10% which, while objectionable, is preferable to the phosphor flaking from the coated lamp.

SUMMARY OF THE INVENTION

There is provided in combination with a fluorescent lamp comprising a sealed elongated light-transmitting glass envelope enclosing a discharge-sustaining filling and operating electrodes supported proximate the ends thereof and adapted to have a radiation-generating discharge maintained therebetween, an improved phosphor coating carried on the envelope interior surface and comprising a predetermined coating weight of preselected finely-divided phosphor particles adhered to the envelope by an improved adhesion promoter. These particles are firmly bound both to one another and to the envelope interior surface by a melted and solidified mixture of boric anhydride acid and sodium borate. The combined weight of sodium borate plus boric anhydride expressed as boric acid prior to heating and melting is from about 1% to 3% by weight of the phosphor, and the relative weight ratios of sodium borate to boric anhydride expressed as boric acid prior to heating and melting are from about 1:2 to 1:4. There is also provided a method of improving the adherence and performance of such a phosphor coating which involves forming the coating suspension comprising a water vehicle, the finely-divided phosphor to be coated, a small amountof water-soluble, viscosity-imparting organic binder material, and an inorganic binder comprising dissolved boric acid and sodium borate, with the weight ratios as specified hereinbefore.

BRIEF DESCRIPTION OF THE DRAWING

For a better understanding of the invention, reference may be had to the sole FIGURE of the drawing which illustrates an annular shaped fluorescent lamp, shown partly in section, which incorporates the improved phosphor coating of the present invention.

DESCRIPTION OF THE PREFERRED EMBODIMENTS

The lamp 10 as shown in the sole FIGURE comprises a sealed, elongated, light-transmitting glass envelope 12 enclosing a discharge-sustaining filling comprising a small amount of mercury 14 and a small charge of inert, ionizable starting gas such as argon at a pressure of 4 torrs. Supported within the envelope proximate thereof are operating electrodes 16 which are adapted to have a radiation-generating discharge maintained therebetween. These electrodes are connected to base pins 18 for energizing the lamp.

In accordance with the present invention, there is carried on the envelope interior surface a coating 20 comprising a predetermined coating weight of preselected finely-divided phosphor particles. As a specific example, the envelope 12 if straight would be 83 cm long and it has a diameter of 3.2 cm. In accordance with conventional practices, the envelope is coated with the phosphor material when it is straight and the envelope is thereafter heated and bent to the desired annular configuration.

Any suitable phosphor can be used and a conventional so-called halophosphate phosphor is normally used for such lamps. As a specific example, this phosphor is calcium halophosphate having an apatite crystalline structure with a small amount of antimony and manganese as activator and the phosphor particles have an average diameter of about 8 to 9 microns. The phosphor particles are firmly bound both to one another and to the interior envelope surface by a melted and solidified mixture 22 of boric anhydride and sodium borate ($Na_2B_4O_7$) with the combined weight of sodium borate plus boric anhydride (expressed in terms of an equivalent amount of boric acid prior to heating and melting) being from about 1% to 3%, and preferably 1.3%, by weight of the phosphor. The relative weight ratios of sodium borate to boric acid prior to heating and melting are from about 1:2 to 1:4 and preferably about 1:3. In its preferred form, very finely divided alumina is mixed with the coated phosphor particles in amount of from about 0.5 to 3% by weight of the phosphor and preferably in amount of about 2% by weight of the phosphor.

In applying the phosphor as a coating in order to improve its performance, there is first formed a phosphor coating suspension comprising a water vehicle, the phosphor to be coated, a small amount of water-soluble viscosity-imparting organic binder material which will oxidize and burn out when heated to a relatively high temperature, and the inorganic binder comprising dissolved boric acid and sodium borate. The weight of the boric acid and sodium borate in the coating suspension is from about 1% to 3% by weight of the phosphor and the relative weight ratios of the sodium borate to a boric acid in the coating suspension are from about 1:2 to 1:4.

The formed coating suspension is flowed over the interior surface of the tube to be coated in order to deposit thereon a predetermined weight of a suspension. As a specific example, there is deposited upon the coated tube approximately three grams of finely-divided phosphor. The water vehicle is then volatilized and the coated tube is lehred at a temperature of from about 600° C. to 650° C. for about 1 minute in an air atmosphere. This temperature is less than the softening temperature of the glass envelope, but it is sufficient to burn out the viscosity-imparting organic binder and it also converts the boric acid to boric anhydride which is melted along with the sodium borate. Upon cooling, these melted materials form a solidified matrix to securely adhere the phosphor particles to one another and to the interior surface of the envelope.

In its preferred form, the coating suspension also includes finely-divided alumina in amount of from about 0.5% to 3% by weight of the phosphor with the preferred alumina addition being about 2% by weight. There is also preferably included sufficient amine to provide a pH of about 8.5 for the suspension, along with a small amount of wetting agent and a small amount of a defoamer.

As a specific example, the following mixture is rolled in a quart size (0.946 liter) ball mill for about 2 hours;

| | |
|---|---|
| Phosphor (cool-white halophosphate) | 300 grams |
| Alumina (particle size 0.05 micron or less) | 6 grams |
| Hydroxyethylcellulose-water vehicle and organic binder | 100 cc. |
| Sodium Borate | 1 gram |
| Boric Acid | 3 grams |
| Triethanolamine | 5 cc. |
| Defoaming Agent | 0.5 gram |
| Wetting Agent | 0.5 gram |

After milling for approximately 2 hours, an additional 250 cc. of hydroxyethylcellulose and water vehicle is added to the mill and the mill again rotated for about 15 minutes. It is then emptied and further additions of vehicle or distilled water may be added to adjust viscosity and specific gravity to the desired values for coating. As a specific example, a viscosity of 70 cps and a specific gravity of 1.15 are representative desired values.

Considering the foregoing specific example in greater detail, the hydroxyethylcellulose vehicle is prepared in accordance with the techniques outlined in U.S. Pat. No. 3,832,199 to Repsher et al. The triethanolamine added in sufficient amounts to provide a pH for the coating suspension of about 8.5 which with the finely-divided alumina improves adherence. The wetting agent can be any conventional detergent-type material such as dodecyl-phenylpolyglycol ether sold by General Analine and Film Corporation under the trademark "Igepal C." More specifically, the material sold under the trademark "Igepal CO-610" is preferred. If a wetting agent is used, it is also desirable to include a defoamer such as stearate-filled mineral base defoamer, and the defoamer material sold under the trademark "Foamkill 649" by Crucible Chemicals Company has been found to be very suitable. The essential elements of the coating suspension are the phosphor, organic vehicle, sodium borate and boric acid. The use of the alumina is highly desirable and the defoamer and wetting agent are optional. Other binders can be used to replace the hydroxyethylcellulose and ethylene oxide polymer or hydroxypropyl cellulose have been found to be suitable.

The combined sodium borate and boric acid coact to provide the present improved results. If the weight ratio of sodium borate to boric acid is less than 1:2, troubles are encountered with melting the mixture and adherence is impaired. If the weight ratio of sodium borate to boric acid is greater than 1:4, troubles are encountered with burning out the viscosity-imparting organic binder. If boric acid alone is used, it is extremely difficult to burn out the organic binder or lehring and residual organic residue can seriously impair the performance of the resulting lamp.

After the straight tube is coated, the tube is bent to the annular configuration as shown in the drawing and the lamp is thereafter completed in accordance with conventional practices. The resulting lamps in a 32 watt size have an output which is approximately 10% better than the output of an otherwise identical lamp coated in accordance with previous practices which used a similar phosphor. More specifically, for a 32 watt annular-shaped fluorescent lamp, in order to obtain adequate adherence for the phosphor, it has been the practice to mill a halophosphate phosphor to an average particle size of about six microns and then coat same using hydroxyethylcellulose binder and a water vehicle. With the addition of the present combined boric acid and sodium borate to the coating suspension, the phosphor need only be milled to an average particle size of about eight to nine microns for good adherence, resulting in the indicated increased light output. Equivalent results are obtained for other wattages of this type of lamp.

As alternative embodiments, phosphors other than halophosphate phosphors can be used, examples being zinc silicate, manganese-activated strontium magnesium phosphate, and other known suitable phosphors which are used commerically. In all tests to date under controlled conditions, the present coating and coated methods improves the light output of the lamp by an average of approximately 10%.

What we claim is:

1. In combination with a fluorescent lamp comprising a sealed elongated light-transmitting glass envelope enclosing a discharge-sustaining filling and operating electrodes supported proximate the ends thereof and adapted to have a radiation-generating discharge maintained therebetween, an improved phosphor coating carried on the envelope interior surface and comprising:

(a) a predetermined coating weight of preselected finely divided phosphor particles carried on the interior surface of said envelope; and (b) said phosphor particles firmly bound both to one another and to the interior envelope surface by a melted and solidified mixture of boric anhydride and sodium borate, the combined weight of sodium borate plus boric anhydride (expressed in terms of an equivalent amount of boric acid prior to heating and melting) being from about 1% to 3% by weight of the phosphor, and the relative weight ratios of sodium borate to boric anhydride (expressed in terms of an equivalent amount of boric acid prior to heating and melting) being from about 1:2 to 1:4.

2. The lamp combination as specified in claim 1, wherein very finely divided alumina is admixed with said coated phosphor particles in amount of from about 0.5 to 3 percent by weight of the phosphor.

3. The lamp combination as specified in claim 1, wherein said elongated envelope has an annular configuration, and said envelope is bent from a straight configuration to an annular configuration after said phosphor is adhered to the interior surface of said envelope.

4. The lamp combination as specified in claim 1 wherein the combined weight of sodium borate prior to heating and melting is about 1.3 percent by weight of the phosphor, and the relative weight ratio of sodium borate to boric anhydride expressed as equivalent boric acid prior to heating and melting is about 1.3.

5. The lamp combination as specified in claim 1, wherein the coated phosphor is halophosphate phosphor.

6. The method of improving the adherence and performance of a phosphor coating applied to the interior surface of a tubular, glass fluorescent lamp envelope, which method comprises:

(a) forming a phosphor coating suspension comprising a water vehicle, the finely divided phosphor to be coated, a small amount of water-soluble viscosity-imparting organic binder material which will oxidize and burn out when heated to a relatively high temperature, and an inorganic binder comprising dissolved boric acid and sodium borate, the combined weight of said boric acid and said sodium borate in said coating suspension being from about 1% to 3% by weight of said phosphor, and the relative weight ratios of said sodium borate to said boric acid in said coating suspension being from about 1:2 to 1:4;

(b) flowing said suspension over the interior surface of said tube to be coated to deposit thereon a predetermined weight of said suspension; and (c) lehring said coating tube for a predetermined time at a predetermined temperature less than the softening temperature of said glass but sufficient to burn out said organic binder and to melt said boric acid and said sodium borate which on cooling forms a solidified matrix to securely adhere said phosphor particles to one another and to the interior surface of said envelope.

7. The method as specified in claim 6, wherein the combined weight of said boric acid and said sodium borate in said coating suspension is about 1.3% by weight of said phosphor, and the relative weight ratio of said sodium borate to said boric acid in said coating suspension is about 1:3.

8. The method as specified in claim 6, wherein said formed coating suspension also includes finely divided alumina in amount of from about 0.5 to 3 percent by weight of said phosphor.

9. The method as specified in laim 8, wherein said formed coating suspension also includes sufficient amine to provide a pH of about 8.5 for said suspension, a small amount of wetting agent, and a small amount of defoamer.

10. The method as specified in claim 6, wherein after said phosphor is coated, said envelope is bent to an annular configuration.

* * * * *